Patented Nov. 4, 1947

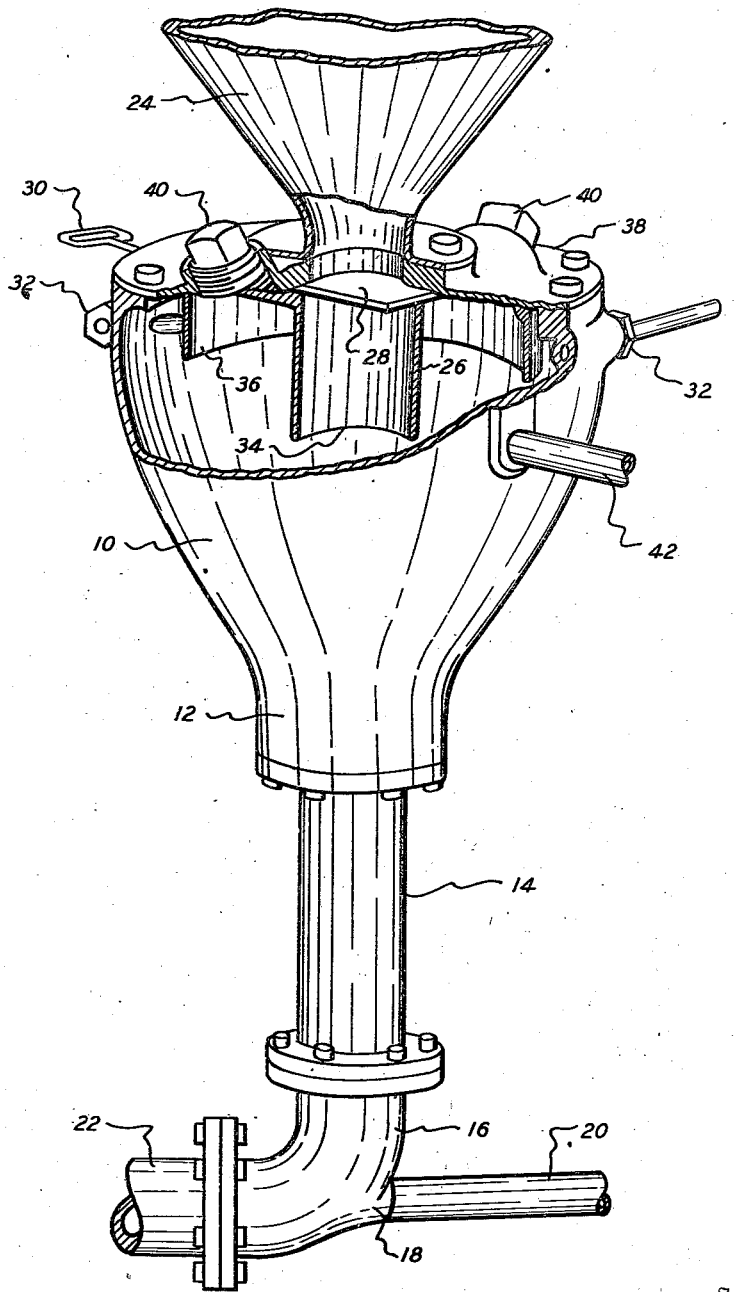

2,430,278

UNITED STATES PATENT OFFICE 2,430,278

CENTRIFUGAL HYDRAULIC DUST EVACUATOR

George C. Daniels, Jackson, Mich.

Application August 18, 1944, Serial No. 550,014

2 Claims. (Cl. 302—15)

The present invention relates to improvements in apparatus for the handling of finely divided particles, such as dust, being particularly adapted to the handling of fly ash produced from burning solid fuel continuously or as formed and discharged.

One of the objects of the present invention is to provide a device of the character described in which the finely divided particles are discharged into a stream of liquid, the device being so constructed as to assure flooding of all surfaces with which the particles contact.

Another object is to provide a device of the character described in which means are provided for controlling the relative pressures in the system for assuring evacuation of the finely divided particles.

A still further object of the invention is to provide an apparatus of the type described having a mixing chamber, the walls of which are covered with a continuous liquid film to prevent any accumulation of dust or other finely divided particles.

A further object of the invention is to provide a device of the character described in which improved means are provided for preventing clogging of the delivery conduit.

Other objects and advantages residing in the construction and arrangement of parts which facilitate inspection and knowledge of the normal function of the device will be fully understood from a detailed consideration of the following specification and annexed claims.

In the drawing, a perspective view of my apparatus is illustrated connected into a continuous discharge system, being partly shown in broken cross section to illustrate portions of the interior.

Finely divided particles, such as dust from industrial operations and fly ash produced by the burning of solid fuel, create considerable problems in handling. Because of their finely divided state such particles cannot be satisfactorily handled by employing conventional methods of transportation of waste materials. Pneumatic and liquid conveyance in conduits has proven to be the most satisfactory method of handling such materials. Pneumatic handling, however, presents high maintenance problems, due to the abrasive action of the particles in the conduits. The use of water or other suitable liquid as a vehicle for the finely divided particles has proven to be the most satisfactory method of handling the same from the standpoint of elimination of abrasive action. On the other hand, devices heretofore proposed have certain inherent structural characteristics which result in frequent clogging and stoppages.

According to the present invention finely divided particles of dust, fly ash and the like entering the delivery end of the apparatus are swept into the discharge line by streams of water, which preferably enter tangentially at the top of a mixing bowl. The construction is such that a water film is caused to cover the entire inside of the mixing bowl through the action of centrifugal forces and the converging sides of the mixing bowl. Such an arrangement has been found to prevent the fine particles of material from sticking to the sides of the mixing bowl.

Referring to the drawing, the mixing bowl 10 is preferably of parabolic shape and has an opening at the bottom portion 12 into a discharge pipe 14. An elbow is indicated at 16 and equipped with an opening 18 through which may extend a transport nozzle 20. Through the nozzle 20 may be discharged a large volume of water under pressure which facilitates the flow of material through the continuation 22 of the discharge pipe. The transport nozzle 20 introduced in the manner indicated also tends to overcome any suction in the dust chamber 24 above the delivery pipe 26.

In order to regulate the dust stream into the bowl 10, a suitable valve 28 is installed between the dust chamber 24 and the delivery pipe 26, the valve 28 being regulated through the handle portion 30 which is an extension thereof. One or more washdown nozzles 32 are provided in the upper portion of the wall of the bowl 10, and it will be noted that the tangential discharge of water from the nozzle 32 takes place above the lower end 34 of the delivery pipe 26. To prevent the water being discharged tangentially from the nozzle 32 from splashing and wetting the dust delivery pipe 26, the baffle ring 36 is provided which is concentrically supported relative to the delivery pipe 26. The centrifugal force of the water and the shape of the bowl 10 result in the entire inner surface of the bowl 10 being flooded with a film of water, against which the dust is discharged and conveyed into the discharge pipe 14. The construction thus described is such that the inside and outside of the delivery pipe 26 is relatively free from wetting and splashing by the water entering through the nozzle 32, with the result that clogging of the entering particles of dust and fly ash due to wetting is obviated.

As shown, the bowl 10 is provided with a cover plate 38 in which is removably supported inspection plugs 40.

Should there be a failure of discharge of the water and dust from the bowl 10 for any reason, an indicating overflow pipe 42 is provided which may carry a suitable sight glass or other associated structure as desired. The pipe 42 is kept sealed by the flow of water across the opening through which pipe 42 communicates with the inside of the bowl 10.

It will be noted that because of the location of the inspection plugs 40 it becomes possible to open the same without disturbing the flow of water or causing the deflection of any water on delivery pipe 26.

It should be apparent from the foregoing description that I have provided an improved apparatus for handling extremely fine particles in which the particles are discharged without wetting into a continuous film of liquid flowing toward the discharge; the design of the mixing bowl and the method of discharge and baffling of the water being such that the tendency is for the water to cling to the surface of the mixing bowl passing toward the discharge with a minimum amount of turbulence and splash and offering to the entering dust and fly ash an efficient vehicle with the elimination of all surfaces on which the fly ash might have a tendency to stick or cling.

Having thus described my invention, what I desire to secure by Letters Patent and claim is:

1. A centrifugal, hydraulic dust evacuator comprising a mixing bowl having a cover plate, a delivery conduit for dust extending through said cover plate and discharging centrally into the upper portion of said bowl, said bowl being enlarged in its upper portion adjacent its cover plate and converging downwardly toward a central discharge opening, a fluid nozzle located in the upper portion of said bowl adjacent said cover plate and adapted to discharge tangentially along the inner surface of said bowl to flood the same with a continuous film of liquid, means for baffling the discharge from said nozzle with respect to said delivery conduit whereby the dust is discharged in said bowl through a zone relatively free from splash and spray prior to impingement against said liquid film.

2. A centrifugal hydraulic dust evacuator comprising a mixing bowl having a parabolic shaped portion converging toward a discharge outlet, means for discharging liquid tangentially into said bowl along the inner surface thereof to flood the same with a continuous film of liquid, means for discharging dust into said bowl at a point below said liquid discharging means, and annular means for baffling said dust discharging means from said liquid discharging means.

GEORGE C. DANIELS.

REFERENCES CITED

The following references are of record in the file of this patent:

UNITED STATES PATENTS

| Number | Name | Date |
|---|---|---|
| 321,573 | Boschke | July 7, 1885 |
| 646,328 | Thorne | Mar. 27, 1900 |
| 990,369 | Metten | Apr. 25, 1911 |
| 1,020,743 | Burlingham et al. | Mar. 19, 1912 |
| 1,479,595 | Field | Jan. 1, 1924 |
| 1,775,265 | Allen | Sept. 9, 1930 |
| 1,914,991 | Coghlan | June 20, 1933 |
| 1,957,583 | Foresman | May 8, 1934 |
| 2,031,578 | Wilgus | Feb. 18, 1936 |
| 2,275,652 | Pursel | Mar. 10, 1942 |
| 2,370,207 | Thorsten et al. | Feb. 27, 1945 |

FOREIGN PATENTS

| Number | Country | Date |
|---|---|---|
| 177,628 | Great Britain | Apr. 6, 1922 |
| 360,613 | Germany | Oct. 5, 1922 |